United States Patent
Aoki (10) Patent No.: US 11,541,591 B2
(45) Date of Patent: Jan. 3, 2023

(54) INJECTION MOLDING MOLD, INJECTION STRETCH BLOW MOLDING MACHINE, AND METHOD FOR PRODUCING HOLLOW MOLDED BODY

(71) Applicant: Aoki Technical Laboratory, Inc., Nagano (JP)

(72) Inventor: Shigeto Aoki, Nagano (JP)

(73) Assignee: Aoki Technical Laboratory, Inc., Nagano (JP)

( * ) Notice: Subject to any disclaimer, the term of this patent is extended or adjusted under 35 U.S.C. 154(b) by 0 days.

(21) Appl. No.: 17/534,512

(22) Filed: Nov. 24, 2021

(65) Prior Publication Data
US 2022/0379542 A1 Dec. 1, 2022

(30) Foreign Application Priority Data
May 25, 2021 (JP) .............................. JP2021-087749

(51) Int. Cl.
*B29C 49/06* (2006.01)
*B29C 49/48* (2006.01)
*B29C 49/52* (2006.01)
*B29C 49/00* (2006.01)

(52) U.S. Cl.
CPC .............. *B29C 49/52* (2013.01); *B29C 49/06* (2013.01); *B29C 49/071* (2022.05); *B29C 2049/4879* (2013.01); *B29K 2995/0073* (2013.01)

(58) Field of Classification Search
CPC .................. B29C 49/06; B29C 49/071; B29C 2049/4879; B29C 49/52; B29K 2995/0073
See application file for complete search history.

(56) References Cited

U.S. PATENT DOCUMENTS

2009/0078672 A1* 3/2009 Parrinello ............ B65D 1/0284
215/383
2018/0326647 A1 11/2018 Mikajiri et al.

FOREIGN PATENT DOCUMENTS

DE 102010015019 A1 10/2011
EP 3287257 A1 2/2018
JP H0485007 A 3/1992
(Continued)

OTHER PUBLICATIONS

European Patent Office, Extended European Search Report for corresponding EP Application No. 21204057.0, dated Mar. 18, 2022, 6 pages.

*Primary Examiner* — Robert B Davis
(74) *Attorney, Agent, or Firm* — Christopher & Weisberg, P.A.

(57) ABSTRACT

When a hollow molded body using a preform to be molded with a thin bottom portion is produced while taking advantage of the roughening of the outer surface of an injection core mold, transferred roughening marks are prevented from appearing on the bottom portion of hollow molded bodies, so that the hollow molded body with an aesthetic bottom portion is obtained. An injection core mold (12) has an outer surface of its tip portion corresponding to a preform bottom portion (10) and a lower end portion (14a) of a preform body portion (14). The outer surface corresponding to the preform bottom portion (10) and the lower end portion (14a) of the preform body portion (14) is a mirror-finished surface (20), and the outer surface of the injection core mold for forming the preform other than the mirror-finished surface is a roughened surface (15).

7 Claims, 5 Drawing Sheets

(56) References Cited

FOREIGN PATENT DOCUMENTS

| | | |
|---|---|---|
| JP | 3436144 B2 | 8/2003 |
| JP | 5524493 B2 | 6/2014 |
| JP | 2017088209 A | 5/2017 |
| JP | 6326790 B2 | 5/2018 |
| JP | 6780155 B1 | 11/2020 |
| WO | 2017098488 A2 | 6/2017 |

* cited by examiner

INJECTION MOLDING MOLD, INJECTION STRETCH BLOW MOLDING MACHINE, AND METHOD FOR PRODUCING HOLLOW MOLDED BODY

CROSS-REFERENCE TO RELATED APPLICATION

This application claims priority to Japanese Application No. 2021-087749, filed May 25, 2021, entitled "INJECTION MOLDING MOLD, INJECTION STRETCH BLOW MOLDING MACHINE, AND METHOD FOR PRODUCING HOLLOW MOLDED BODY", the entirety of which is incorporated herein.

FIELD

The present invention relates to an injection molding mold for molding a preform, an injection stretch blow molding machine, including the injection molding mold, for producing a hollow molded body from a preform, and a method for producing a hollow molded body.

BACKGROUND

In Japanese Patent No. 6326790 (hereinafter referred to as Patent Literature 1), a problem is mentioned where, since the preform has a small taper and an elongated shape, it is difficult to remove an injection core mold in an injection molding mold for molding the preform. Patent Literature 1 further discloses that the outer surface of the injection core mold is mirror-finished for easy removal as a countermeasure. Even in this case, air cannot smoothly escape therefrom, resulting in the sealing and accumulation of the inside air. This further results in the generation of accumulated air marks in the molded preform.

Patent Literature 1 further describes that fine concavities and convexities such as a leather pattern, a satin pattern, or similar fine concavities and convexities are formed in the outer surface of the injection core mold by etching. Using this technique, Patent Literature 1 also discloses that the outer surface of the injection core mold is subjected to a texture processing and a blast processing to roughen the surface, thereby creating an air layer between the resin injected and the injection core mold. This configuration allows air to flow toward the tip end of the injection core mold. In the case of blasting, Patent Literature 1 explains that when fine projectile particles are sprayed onto the surface of the injection core mold and roughen the surface to form fine concavities and convexities thereon, molten resin forms an air layer without the pattern of the concavities and convexities being transferred from the injection core mold, resulting in improvement of the releasability of the mold from the resulting preform due to this air layer.

Furthermore, Patent Literature 1 discloses a technique in which portions of the surface of the injection core mold are subjected to mirror finishing processing and texture processing. The portions subjected to the mirror finishing processing include the surface corresponding to the preform inner surface near the tip of the preform mouth, and the surface corresponding to the preform inner surface facing the protrusions such as a flange or a coupler. The portions subjected to the texture processing include other portions than the mirror-finished surface. This technique utilizes the cooling facilitation effect of the preform resin in close contact with the injection core mold at the mirror-finished portion, and thus can prevent the preform from being deformed due to abnormal shrinkage.

Further, Japanese Patent No. 6780155 (hereinafter referred to as Patent Literature 2) discloses a technique to facilitate the removal of the injection core mold from the injection molded preform. Specifically, grooves extending from a body portion definition section to a neck portion definition section are formed on the surface of the body portion definition section of the injection core mold. Here, a centerline average roughness, in the circumferential direction, of the surface of the body portion definition section of the injection core mold where the grooves are formed is set to 0.2 µm or more and not more than 15 µm.

Further, Japanese Patent Application Laid-Open No. H04-085007 (hereinafter, referred to as Patent Literature 3) also discloses another technique to facilitate the removal of the injection core mold from the injection molded preform. Specifically, a large number of fine recesses are formed in the surface layer of the injection core mold below the mouth portion molding portion, so that the recesses allow air to remain therein during preform molding and to form air layers intermittently between the soft preform and the injection core mold. Furthermore, this can allow the inner surface of the soft preform and the outer surface of the injection core mold to be partially in contact with each other due to the recesses of the injection core mold. As a result, the frictional resistance when removing the injection core mold from the injection molded preform can be reduced.

Japanese Patent Application Laid-Open No. 2017-088209 (hereinafter, referred to as Patent Literature 4) does not show a satisfactory technique for removing the injection core mold from a preform, but shows a method for forming a texture imparting pattern, which is formed of a rough surface including fine concavities and convexities, on a hemispherical surface of a tip of the injection core mold. The invention of Patent Literature 4 itself aims at effectively generating foams when the bottle is opened, and shows a technique of transferring a pattern from an injection core mold to a bottom portion of a preform which has been injection molded.

PRIOR ART LITERATURE

Patent Literature 1: Japanese Patent No. 6326790
Patent Literature 2: Japanese Patent No. 6780155
Patent Literature 3: Japanese Patent Application Laid-Open No. H04-0845007
Patent Literature 4: Japanese Patent Application Laid-Open No. 2017-088209

SUMMARY

Technical Problem

A molding machine configured to mold hollow molded bodies such as PET bottles in a hot parison system can include an injection molding section configured to injection mold a preform by injecting a molten resin from an injection apparatus, a blow molding section, configured to blow a gas into a preform which has been moved from the injection molding section and is still in a high temperature state, while stretching the preform to blow mold a hollow molded body, and an ejection section configured to eject the hollow molded body out of the molding machine.

The injection molding section, the blow molding section, and the ejection section are provided so as to be positioned in order along the rotation direction of a rotary plate. The rotary plate rotates at predetermined angles to move lip molds so that they are positioned at respective points corresponding to the injection molding section, the blow molding section, and the ejection section in that order. In the injection molding section, there is an injection molding mold including an injection core mold and an injection cavity mold. The injection molding mold is combined with the lip mold, thereafter the molten resin is injected into the mold to injection mold a preform.

The preform having been injection molded is transferred to the blow molding section by the lip mold, and the lip mold is then combined with a blow molding mold, which is a split mold, to place the preform there inside. In the blow molding section, the preform is stretched in the height direction by pushing down the bottom portion of the preform with a stretching rod while a gas is blown thereinto, thereby blow molding a hollow molded body from the preform.

Then, the hollow molded body having been blow molded is transferred to the ejection section by the lip mold which moves by the rotation of the rotary plate. In the ejection section, the lip mold releases the mouth of the hollow molded body so that the hollow molded body is ejected out of the molding machine.

After releasing the hollow molded body, the lip mold moves to the injection molding section by the rotation of the rotary plate, and then in this injection molding section, as described above, the lip mold is combined with the injection molding mold again for the next injection molding of the preform.

In the injection stretch blow molding machine, the production efficiency of the hollow molded body is increased by shortening the molding cycle of the preform. For this purpose, as described above, the outer surface of the injection core mold can be roughened to enhance the releasability, so that the molding cycle of the preform can be shortened.

Furthermore, the molding cycle of the preform can be shortened by releasing the preform from the injection molding mold within a shorter interval, and by transferring the resulting preform to the blow molding mold with a shorter amount of time necessary to perform blow molding. By doing so, it is possible to increase the production efficiency of the hollow molded body.

When the preform in a high-temperature state is blow molded with the blow molding mold by accelerating the release of the preform, if the preform bottom portion has the same thickness as the preform body portion, the amount of heat kept within the preform bottom portion becomes high. This can cause breakage of the preform bottom portion by the stretching rod. To cope with this, the preform bottom portion is designed to be thin in order to facilitate cooling in the injection molding mold, so that the strength of the preform bottom portion is increased.

As an example, the shape of the preform is often set by setting the wall thickness at the lowermost end of the preform bottom portion to 1.0 mm (excluding the gate portion), setting the wall thickness of the preform body portion, which shapes the body portion including the shoulder position of the hollow molded body (bottle), to 2.1 to 2.2 mm, and setting the ratio of the wall thickness of the preform bottom portion relative to the wall thickness of the preform body portion to about 1:2.

Attaining good mold releasability of a preform by roughening the outer surface of the injection core mold as well as the reduction of the wall thickness of the preform bottom portion can prevent the preform from breaking during stretching even when the preform has been released from the preform molding mold within a shorter interval. This method can shorten the molding cycle of the preform as well as increase the production efficiency of the hollow molded body.

However, in this method, the outer surface of the injection core mold is subjected to a roughening process (roughening) on the entire surface corresponding to the preform. Thus, roughing marks are transferred to the bottom surface of the preform, thereby appearing as stretched roughing marks on the bottom surface of the hollow molded body having been blow molded.

More specifically, the degree of stretching and expansion of the preform body portion into the body portion of the molded body more than the preform bottom portion, so the roughening marks transferred from the injection core mold is significantly expanded and disappears substantially. In contrast, the preform bottom portion is stretched and blow molded to the bottom portion of the molded body with a certain degree of hardness being secured as the bottom. Thus, the stretching and expansion thereof is less than the body portion, and the transferred roughening marks remain spread over the entire bottom surface.

As a result, the bottom portion of the hollow molded body may be formed in a state where the roughening marks still remain, and there have been problems where the appearance of the hollow molded body is impaired.

In view of the above-mentioned circumstances, an object of the present invention is to prevent roughening marks from appearing on the bottom portion of hollow molded bodies produced using preforms to be molded with a thin bottom portion while taking advantage of the roughening of the outer surface of the injection core mold. Also, the present invention aims at providing a hollow molded body with an aesthetic bottom portion.

Solution to Problem

The present invention has been made in consideration of the above-mentioned problems, and provides an injection molding mold, including an injection core mold and an injection cavity mold, for molding a preform with a preform bottom portion thinner than a preform body portion.

This injection molding mold is characterized in that the injection core mold has an outer surface of its tip portion corresponding to a preform bottom portion and a lower end portion of a preform body portion where the preform bottom portion continues to the preform body portion, the outer surface corresponding to the preform bottom portion and the lower end portion of the preform body portion is a mirror-finished surface, and the outer surface of the injection core mold for forming the preform other than the mirror-finished surface is a roughened surface. This configuration can solve the above-mentioned problems.

Herein, the mirror-finished surface is a surface with a surface-finished state, for example, corresponding to a surface roughness with the arithmetic mean roughness Ra of 0.2 μm or less or the maximum height Rz of 0.8 μm or less in accordance with JIS B 0601: 2001, although the present invention is not limited to this definition (these values).

In the injection molding mold described above, the roughened surface is preferably a finished surface obtained by roughening the outer surface of the injection core mold so as to form longitudinal fine grooves along the outer surface in a height direction of the injection core mold.

Further, another aspect of the present invention is an injection stretch blow molding machine including:
- an injection molding section with an injection molding mold for injection molding a preform, and
- a blow molding section for stretching and blow molding the injection molded preform to mold a hollow molded body.

In this injection stretch blow molding machine, the injection molding mold of the injection molding section includes an injection core mold and an injection cavity mold, and is configured to mold a preform with a preform bottom portion with a wall thickness thinner than a preform body portion.

This injection stretch blow molding machine is characterized in that the injection core mold has an outer surface of its tip portion corresponding to a preform bottom portion and a lower end portion of a preform body portion where the preform bottom portion continues to the preform body portion, the outer surface corresponding to the preform bottom portion and the lower end portion of the preform body portion is a mirror-finished surface, and the outer surface of the injection core mold for forming the preform other than the mirror-finished surface is a roughened surface. This configuration can solve the above-mentioned problems.

In the injection stretch blow molding machine described above, the roughened surface is preferably a finished surface obtained by roughening the outer surface of the injection core mold so as to form longitudinal fine grooves along the outer surface in a height direction of the injection core mold.

Still another aspect of the present invention is a method for producing a hollow molded body, including: an injection molding step of injection molding a preform; and a blow molding step of stretching a preform obtained in the injection molding process while blowing a gas into the preform for blow molding to mold a hollow molded body.

In this method, the injection molding step is to injection mold a preform with an injection molding mold including an injection core mold and an injection cavity mold, the preform having a preform bottom portion with a wall thickness thinner than a preform body portion.

This method is characterized in that the injection core mold has an outer surface of its tip portion corresponding to a preform bottom portion and a lower end portion of a preform body portion where the preform bottom portion continues to the preform body portion, the outer surface corresponding to the preform bottom portion and the lower end portion of the preform body portion is a mirror-finished surface, and the outer surface of the injection core mold for forming the preform other than the mirror-finished surface is a roughened surface. This configuration can solve the above-mentioned problems.

In the method for producing a hollow molded body described above, in the blow molding step, the preform bottom portion and the lower end portion of the preform body portion of the preform, which correspond to the mirror-finished surface of the injection core mold, preferably form a bottom portion of the hollow molded body and a curved rising portion of the hollow molded body continuous with the bottom portion toward a body portion of the hollow molded body.

Furthermore, the roughened surface is preferably a finished surface obtained by roughening the outer surface of the injection core mold so as to form longitudinal fine grooves along the outer surface in a height direction of the injection core mold.

Advantageous Effects of Invention

The injection molding mold according to the present invention is a mold configured to mold a preform with a preform bottom portion that has a wall thickness thinner than that of a preform body portion, and the outer surface of the tip portion of the injection core mold, corresponding to the preform bottom portion and the lower end portion of the preform body portion, is a mirror-finished surface. Thus, the surface shape of the mirror-finished surface will be transferred to the portions (inner surface) from the lower end portion of the preform body portion to the preform bottom portion.

Furthermore, the outer surface of the injection core mold for forming the preform other than the mirror-finished surface is a roughened surface, and thus the preform mold can be released smoothly from the injection core mold, whereby the preform, still in a soft state at a high temperature, will not collapse at the time of mold releasing.

Furthermore, in the injection molding step, the portion from the lower end portion of the preform body portion to the preform bottom portion is easily cooled due to its thinner wall. Thus, breakage of the preform bottom portion is prevented even when the blow molding step is performed, and an advantageous production of a hollow molded body is achieved.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
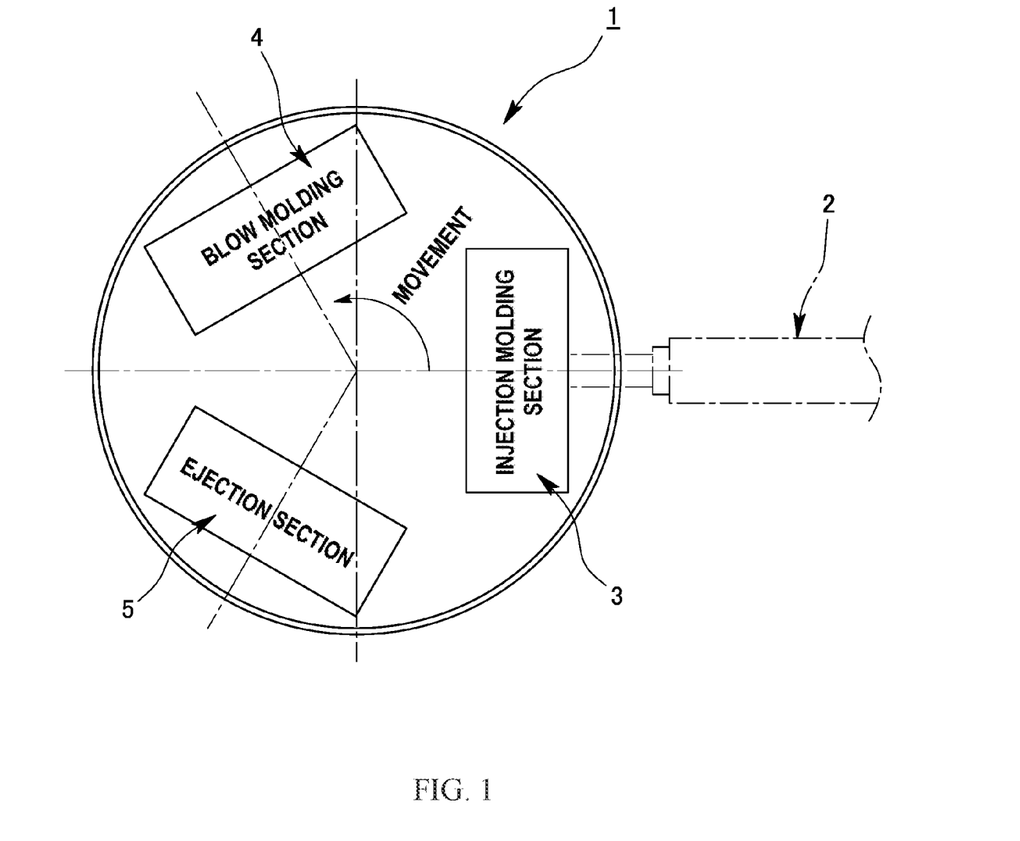
FIG. 1 is an explanatory view schematically illustrating an example of an injection stretch blow molding machine according to the present invention.

FIG. 1 schematically illustrates an injection stretch blow molding machine 1 configured to produce a hollow molded body made of a synthetic resin such as a PET bottle or a wide-mouth bottle.

Injection Stretching Blow Molding Machine:

The injection stretching blow molding machine 1 is an apparatus configured to produce a hollow molded body with a hot parison system. As illustrated in FIG. 1, the injection stretching blow molding machine 1 includes an injection molding section 3 configured to supply a molten resin from an injection device 2, a blow molding section 4 configured to blow mold a hollow molded body, and an ejection section 5 configured to eject the hollow molded body to the outside of the molding machine. These sections 3, 4, and 5 are disposed in this order in the rotation direction of a rotary plate (not illustrated) which has lip molds 8. Movement indicated by the arrow in FIG. 1 shows the rotation direction of the rotary plate as well as the moving direction of the lip molds 8.

Figure 2:
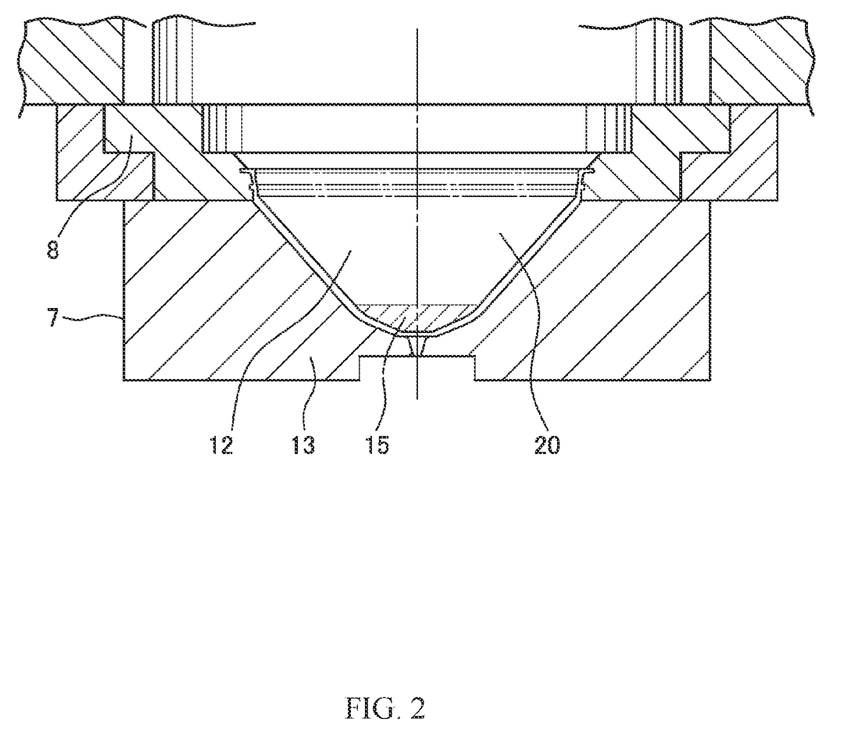
FIG. 2 is an explanatory view illustrating an injection molding mold in a technical investigation.

Technical investigations which have been conducted in the course of achieving the present invention and embodiments of the present invention will be described below. It should be noted that the injection stretch blow molding machine 1, according to the technical investigations, and according to the embodiment of the present invention both have the same Technical Investigation:

First, in the technical investigation, a preform 6 is injection molded by using an injection molding mold 7 illustrated in FIG. 2. After that, the preform 6 is stretched in a direction in which the preform 6 protrudes out, and a gas is blown into the preform 6 to blow mold a wide-mouth cup-shaped container A.

The injection molding mold 7 used in the technical investigation includes a cone-shaped injection core mold 12 which protrudes downward, and an injection cavity mold 13 which opens upward in a cone shape. When injection molding is performed, the injection molding mold 7 is combined with a lip mold 8.

Figure 3:
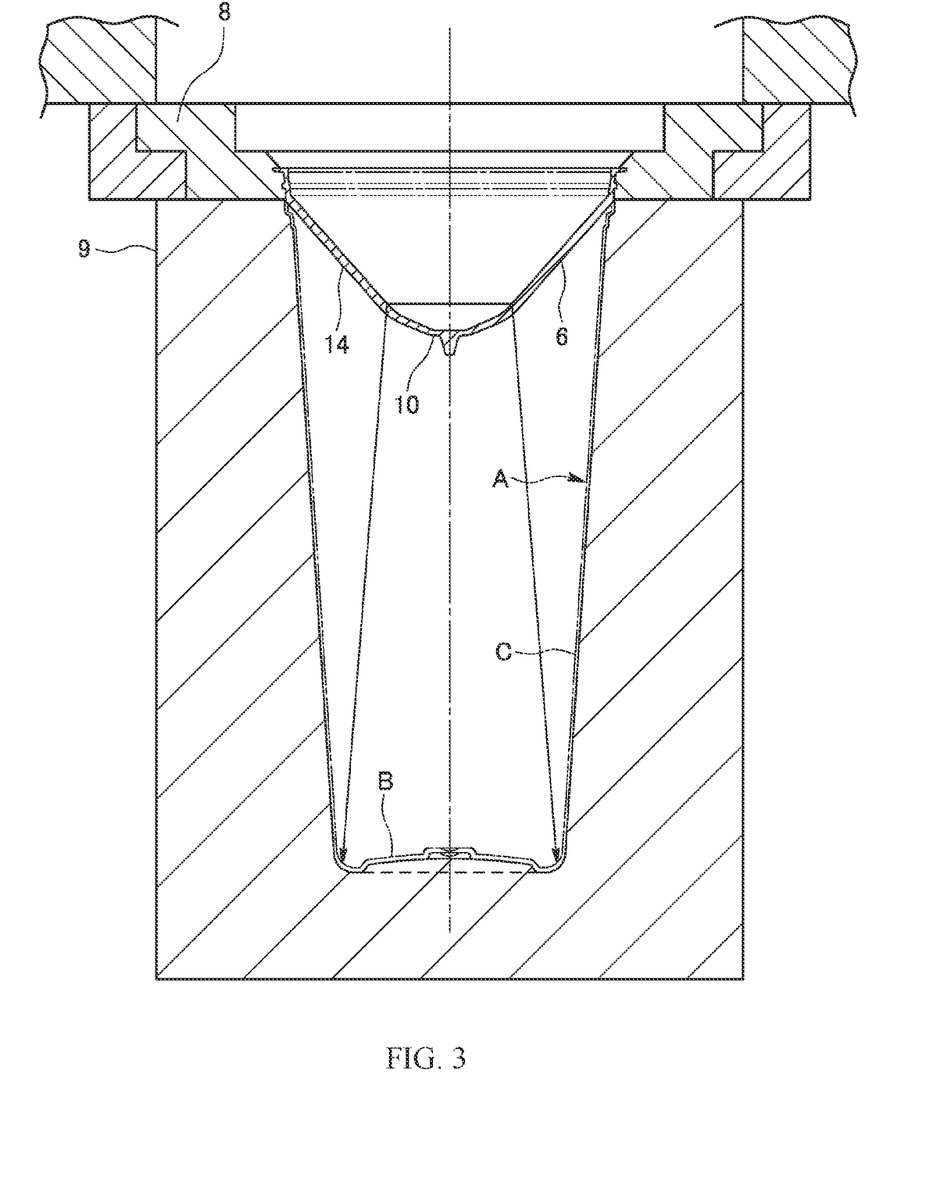
FIG. 3 is also an explanatory view illustrating a blow molding mold in the technical investigation.

The preform 6 that is injection molded by the resulting injection molding mold 7 has a cone shape opening upward as illustrated in FIG. 3. The preform 6 includes a preform bottom portion 10 and a preform body portion 14 which is formed continuously with the preform bottom portion 10, or tapered toward the preform bottom portion 10 while being provided with a mouth portion at the upper edge.

The preform 6 has a shape in which the wall thickness of the preform bottom portion 10 is made smaller than that of the preform body portion 14. Although the wall thickness of preforms depends on the shape, size, and the like of the hollow molded body as the final product, as a specific example, the wall thickness of the preform bottom portion 10 is 1.2 mm, and the wall thickness of the preform barrel is 2.0 mm.

In the injection molding mold 7, the preform 6 is injection molded while reducing the wall thickness of the preform bottom portion 10 to be less than that of the preform body portion 14 so that the cooling of the preform bottom portion 10 is facilitated. The facilitated cooling of the preform bottom portion can keep the preform bottom portion 10 hard even when it is placed in the blow molding mold 9 after being released from the injection molding mold 7, and thus, the preform bottom portion 10 does not break even if the stretching operation is performed.

FIG. 3 illustrates a blow molded cup-shaped container A together with a cone-shaped preform 6 arranged in a blow molding mold 9 in an injection stretch blow molding machine 1 which is constructed for purpose of the technical investigation. Since the preform bottom portion 10, as described above in the blow molding mold 9, has a thin wall and is hard, the preform 6 expands in the radial direction thereof by stretching and blowing a blow gas (in a direction perpendicular to the height direction of the preform 6) to form a container bottom portion B of the cup-shaped container A.

On the other hand, since the preform body portion 14 has a thicker wall as compared to the preform bottom portion 10 and is maintained in a soft state, it is expanded and stretched in vertical and radial directions by stretching and blowing, thereby molding a container body portion C.

In this technical investigation, the outer peripheral surface at the lower end of the injection core mold 12, corresponding to the preform bottom portion 10, is a roughened surface 15, where many longitudinal fine grooves are provided, directed upward along the injection core mold surface from the position of the lowermost end. To give a specific processing example, longitudinal roughening may be performed using sandpaper of an adequate grit.

The outer surface of the injection core mold 12 corresponding to the preform body portion 14 is formed as a mirror-finished surface 20, which is formed by polishing with such abrasives or polishing pastes so as to achieve a smooth surface of a predetermined surface roughness or less. In FIG. 3, the outer peripheral portion of the preform bottom portion 10 and the outer peripheral portion of the container bottom portion B are connected by a chain line in order to facilitate understanding of how the preform bottom portion 10 expands when it is formed.

According to this technical investigation, it is possible to confirm that, with the injection molding mold 7 configured to mold the cone-shaped preform 6, the formation of the preform bottom portion 10 with the reduced wall thickness can prevent breakage of the preform bottom portion 10 when the preform 6 is blow molded.

Further, the provision of the roughened surface 15 at the lower end of the injection core mold 12 is intended to prevent a problem where air enters the preform core layer while the force of tearing is applied to the preform 6 at the time of mold opening, and to facilitate the release of the preform. Then, it was found that, with the settings to reduce the wall thickness of the preform bottom portion 10, the injection core mold 12 can be separated from the preform 6 without causing any failure even with a shorter release interval.

Next, an embodiment of the present invention will be described with reference to FIGS. 4 and 5. As described above, the basic configuration of the injection stretch blow molding machine 1 is the same as that described in the technical investigation.

The injection molding section 3 inside the injection stretch blow molding machine 1 according to the embodiment has an injection molding mold 7 for use in injection molding a preform 6 with a molten resin from the injection device 2. While supported by a lip mold 8 which has been combined with the injection molding mold 7, the preform 6 is released from the injection molding mold 7 and transferred to the blow molding section 4.

The blow molding section 4 includes a blow molding mold 9 which is a split mold. The lip mold 8 is combined with the blow molding mold 9 and the preform 6 is disposed inside the blow molding mold 9. After that, a stretching rod (not shown) enters the inside of the preform 6 and performs stretching to push down the preform bottom portion 10. At the same time, a gas is blown into the preform 6 to blow mold it into a hollow molded body 11.

The blow molded hollow molded body 11 is then transferred from the blow molding section 4 to the ejection section 5 by the movement of the lip mold 8 released from the blow molding mold 9. The lip mold 8 transferred to the ejection section 5 is opened to release the grip on the mouth portion of the hollow molded body 11, thereby ejecting the hollow molded body 11 out of the molding machine.

The lip mold 8 is closed again and is transferred to the injection molding section 3. The lip mold 8 transferred to the injection molding section 3 is combined with the injection molding mold 7, and a molten resin is fed into the injection molding mold 7 to injection mold the preform 6 as described above.

Method for Producing Hollow Molded Body:

The method for producing hollow molded bodies by the injection stretch blow molding machine 1 as described above can include an injection molding step of injection molding a preform 6 in the injection molding section 3, a blow molding step of stretching the preform 6 obtained in the injection molding section 3 and blowing a gas thereinto to blow mold the hollow molded body 11 in the blow molding section 4, and an ejection step of transferring the hollow molded body 11 blow molded by the blow molding section 4 to reach the ejection section 5, thereby ejecting the hollow molded body 11 out of the molding machine 1. The hollow molded body 11 is thus obtained by performing the injection molding step, the blow molding step, and the ejection step in this order.

The movement of the lip mold 8 is performed by rotation of the rotary plate by every predetermined angle. In particular, in the transition from the injection molding step to the blow molding step, the lip mold 8 moves while gripping the preform 6. In the transition from the blow molding step to the ejection step, the lip mold 8 also moves while supporting the hollow molded body. In the transition from the ejection step to the injection molding step, only the lip mold 8 that has released the hollow molded body moves to the injection molding section.

As described above, the lip molds 8 move from the injection molding section 3 to the blow molding section 4, from the blow molding section 4 to the ejection section 5, and from the ejection section 5 to the injection molding section 3 in this order, whereby the injection molding step, the blow molding step, and the ejection step are consecutively performed to produce the hollow molded bodies 11. The rotary plate is provided with three lip molds 8 at three positions corresponding to the injection molding section 3, the blow molding section 4, and the ejection section 5, and the production of the hollow molded bodies is performed while the above-mentioned different steps are performed at the three respective positions with corresponding lip molds 8 staying stationary at each position.

Figure 4:
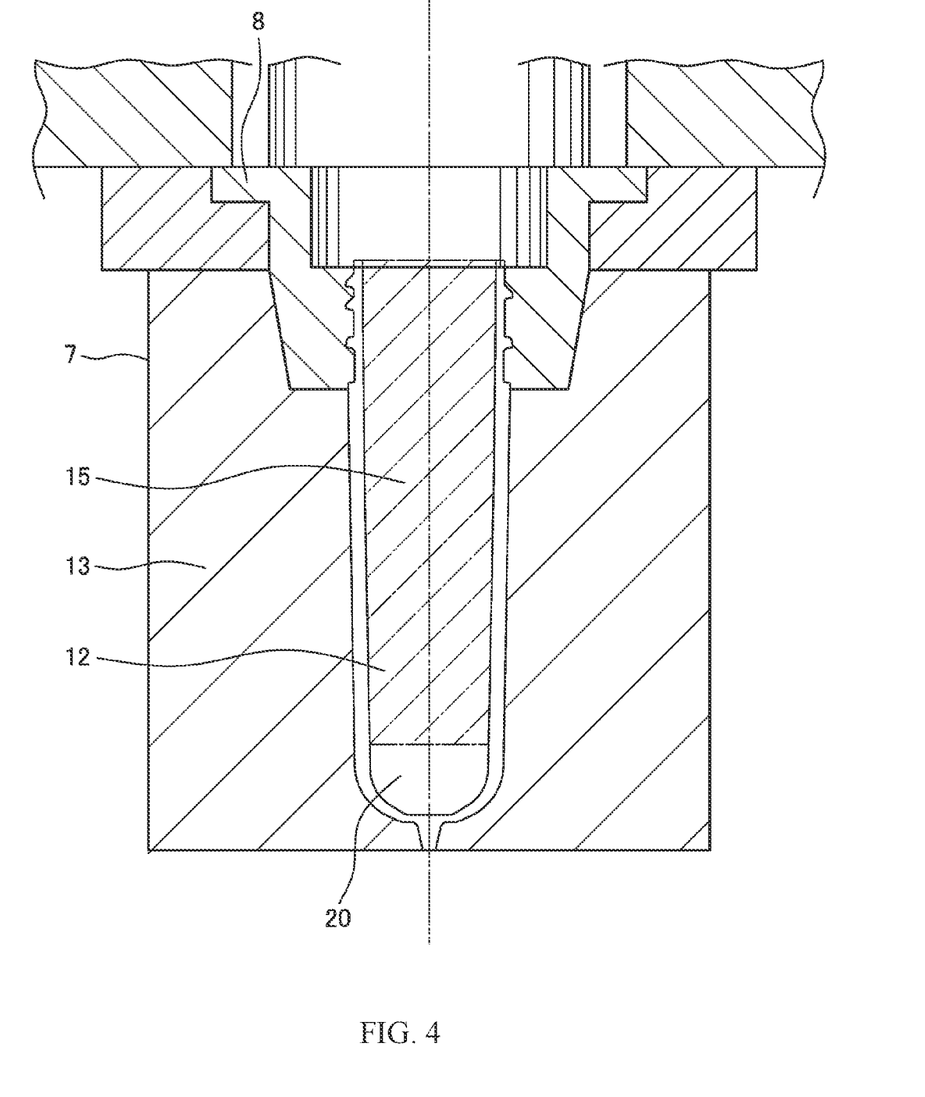
FIG. 4 is an explanatory view illustrating an example of an injection molding mold.

Injection Molding Mold:

The injection molding mold 7 in the injection molding section 3 as illustrated in FIG. 4 includes an injection core mold 12 and an injection cavity mold 13, which are combined with the lip mold 8 to be utilized for injection molding a molten resin. The injection molding mold 7 constituted by the injection core mold 12, the injection cavity mold 13, and the lip mold 8 are used in molding the preform in such a manner that the preform bottom portion 10 has a wall thickness thinner than that of the preform body portion 14, with the wall thickness being made gradually thinner from a lower end portion 14a of the preform body portion 14 toward the lowermost end 10a at the preform bottom portion 10 as illustrated in FIG. 5.

Since the preform is molded to be gradually thinner from the lower end portion 14a of the preform body portion 14 to the lowermost end 10a of the preform bottom portion 10, cooling of the preform bottom portion 10 from the lower end portion 14a of the preform body portion 14 can be accelerated in the injection molding mold 7 so as to increase the hardness around the preform bottom portion 10. Furthermore, when performing the stretching in the blow molding section 4, breakage or penetration by the stretching rod does not occur at the preform bottom portion 10.

The injection molding mold 7 is illustrated in FIG. 4 in such a manner that the injection molded preform 6 has its wall thickness gradually decrease from the lower end portion 14a of the preform body portion 14 toward the lowermost end 10a of the preform bottom portion 10 and is the thinnest at the position of the lowermost end 10a. It should be noted that the description of thinner wall state of the lowermost end 10a is done so without accounting for the gate portion.

Injection Core Mold:

In the injection molding mold 7 according to the embodiment of the present invention, the roughened surface 15 is located on the outer surface of the injection core mold 12 except for on a part described below. The roughened surface 15 is prepared by roughing, in the vertical (longitudinal) direction of the preform 6, the outer surface of the injection core mold 12 that has been polished as a mirror finish to a predetermined surface roughness, so as to form longitudinal fine grooves along the height direction of the preform 6.

Roughened Surface:

The roughened surface 15 is finished to have the surface roughness with the purpose of achieving improvement regarding the flow of the molten resin fed into the injection molding mold 7 as well as improvement regarding the removal of the injection core mold 12 at the time of mold release.

Figure 5:
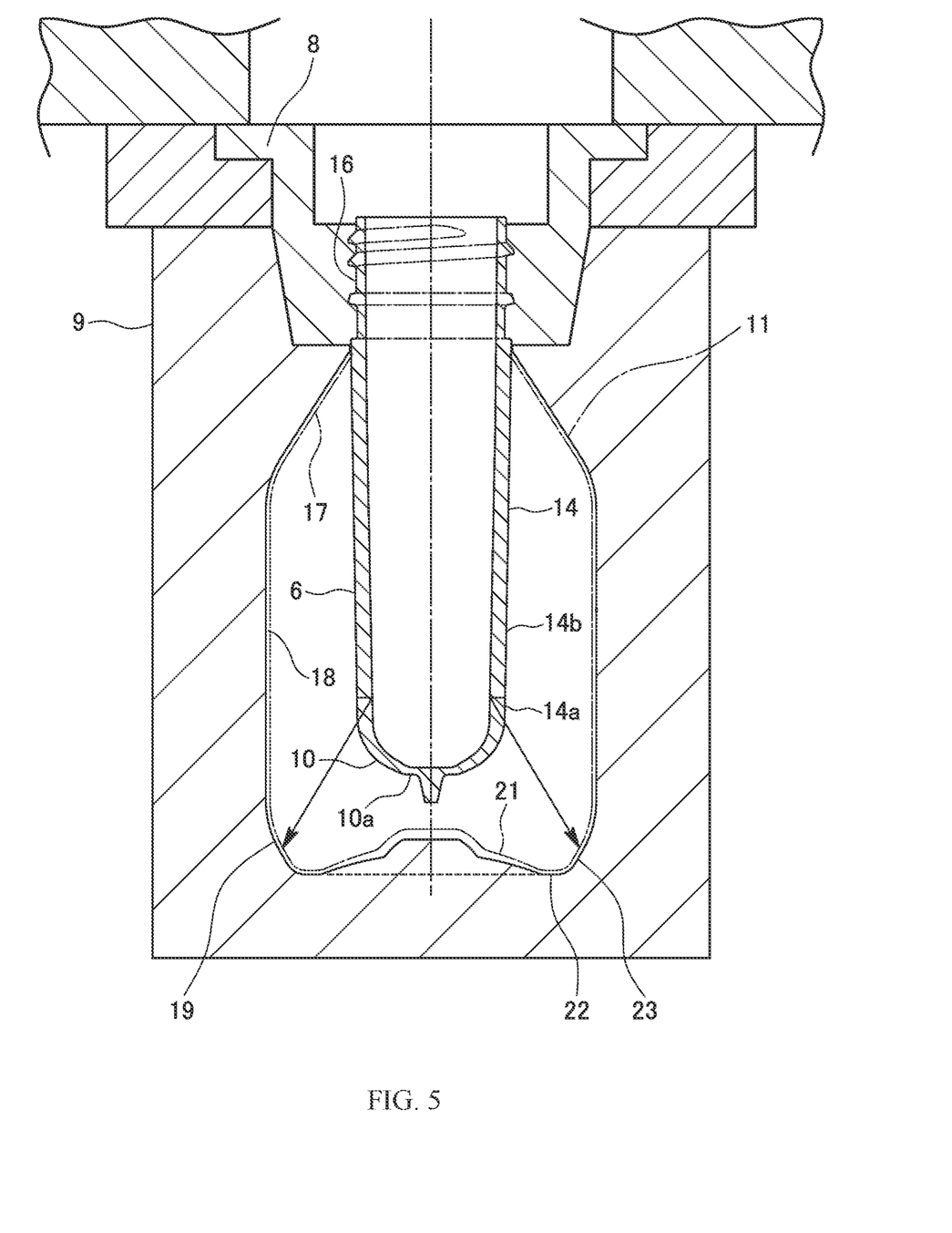
FIG. 5 is an explanatory view illustrating together a state of placing a preform in the blow molding mold and a state of blow molding the hollow molded body.

The specific position of the roughened surface 15 is shown as a region with oblique lines in FIG. 4, while a portion corresponding to the roughened surface 15 in the preform 6 is illustrated in FIG. 5. Portions corresponding to the inner surface of a preform mouth portion 16 of the preform 6 and the inner surface of a general portion 14b of the preform body portion 14, which will become a shoulder portion 17, a body portion 18 and a skirt portion starting end 19 of the hollow molded body 11 when the hollow molded body 11 is molded, are the portions with the roughened surface 15 formed by performing a longitudinal roughening.

Mirror Finished Surface:

The tip portion of the outer surface of the injection core mold 12 (lower end portion of the injection core mold) has a mirror-finished surface 20 without roughening. The mirror-finished surface 20 corresponds to the surface from the inner surface at the lower end portion 14a of the preform body portion 14 to the inner surface at the lowermost end 10a of the preform bottom portion 10 in the preform 6. Thus, the mirror state of the mirror-finished surface 20 is transferred to these inner surfaces of the preform.

The portion, to which the mirror surface state of the mirror-finished surface 20 has been transferred, ranging from the lower end portion 14a of the preform body portion 14 to the lowermost end 10a of the preform bottom portion 10, is formed as a curved rising portion 23 in the blow molding step. The curved rising portion 23 is formed to extend from a bottom portion 21 of the hollow molded body 11 continuous to the skirt portion starting end 19 via a grounding portion (rim portion) 22, which is the outer periphery of the bottom portion 21, while enlarging the diameter toward the preform body portion 14.

In FIG. 5, the outer peripheral portion of the curved rising portion 23 of the hollow molded body 11 is connected to the outer peripheral portion of the lower end portion 14a of the preform body portion 14 by a dashed line. This is to facilitate understanding of the expansion of the region up to the lower end portion 14a of the preform body portion 14 to a region up to the curved rising portion 23 of the hollow molded body 11.

As illustrated in FIGS. 4 and 5, any roughening marks are not transferred to the region of the bottom portion 21 and the curved rising portion 23 of the hollow molded body 11 since the mirror-finished surface 20 of the injection core mold 12 is transferred to the region from the lowermost end 10a of the preform bottom portion 10 to the lower end portion 14a of the preform body portion 14. Thus, the hollow molded body 11 is obtained without impairing the aesthetics of the bottom portion.

In the present invention, any appropriate finishing method for forming the mirror-finished surface 20 can be adopted.

The surface state of the mirror-finished surface 20 can be described as a surface with a state of finishing corresponding to an arithmetic mean roughness Ra of 0.2 μm or less or a maximum height Rz of 0.8 μm or less in accordance with JIS B 0601:2001 as described above, although it is not limited to a particular numerical value representing a roughness.

REFERENCE SIGNS LIST 1 injection stretch blow molding machine
3 injection molding section
4 blow molding section
5 ejection section
6 preform
7 injection molding mold
8 lip mold
9 blow molding mold
10 preform bottom portion
10a lowermost end of preform bottom portion
11 hollow molded body
12 cone-shaped injection core mold
13 injection cavity mold
14 preform body portion
14a lower end portion of preform body portion
14b general portion of preform body portion
15 roughened surface
16 preform mouth portion
17 shoulder portion
18 body portion
19 skirt portion starting end
20 mirror-finished surface
21 bottom portion
22 rim portion
23 curved rising portion

What is claimed is:

1. An injection molding mold comprising an injection core mold and an injection cavity mold, for molding a preform with a preform bottom portion thinner than a preform body portion, wherein
the injection core mold has an outer surface of a tip portion thereof corresponding to a preform bottom portion and a lower end portion of a preform body portion where the preform bottom portion continues to the preform body portion,
the outer surface corresponding to the preform bottom portion and the lower end portion of the preform body portion is a mirror-finished surface, and
the outer surface of the injection core mold for forming the preform other than the mirror-finished surface is a roughened surface.

2. The injection molding mold of claim 1, wherein the roughened surface is a finished surface obtained by roughening the outer surface of the injection core mold so as to form longitudinal fine grooves along the outer surface in a height direction of the injection core mold.

3. An injection stretch blow molding machine comprising:
an injection molding section with an injection molding mold for injection molding a preform, and
a blow molding section for stretching and blow molding the injection molded preform to mold a hollow molded body, wherein
the injection molding mold of the injection molding section includes an injection core mold and an injection cavity mold, and is configured to mold a preform with a preform bottom portion with a wall thickness thinner than a preform body portion,
the injection core mold has an outer surface of a tip portion thereof corresponding to a preform bottom portion and a lower end portion of a preform body portion where the preform bottom portion continues to the preform body portion,
the outer surface corresponding to the preform bottom portion and the lower end portion of the preform body portion is a mirror-finished surface, and
the outer surface of the injection core mold for forming the preform other than the mirror-finished surface is a roughened surface.

4. The injection stretch blow molding machine of claim 3, wherein the roughened surface is a finished surface obtained by roughening the outer surface of the injection core mold so as to form longitudinal fine grooves along the outer surface in a height direction of the injection core mold.

5. A method for producing a hollow molded body, comprising:
an injection molding step of injection molding a preform; and
a blow molding step of stretching a preform obtained in the injection molding process while blowing a gas into the preform for blow molding to mold a hollow molded body, wherein
the injection molding step is to injection mold a preform with an injection molding mold including an injection core mold and an injection cavity mold, the preform having a preform bottom portion with a wall thickness thinner than a preform body portion,
the injection core mold has an outer surface of a tip portion thereof corresponding to a preform bottom portion and a lower end portion of a preform body portion where the preform bottom portion continues to the preform body portion,
the outer surface corresponding to the preform bottom portion and the lower end portion of the preform body portion is a mirror-finished surface, and
the outer surface of the injection core mold for forming the preform other than the mirror-finished surface is a roughened surface.

6. The method for producing a hollow molded body of claim 5, wherein, in the blow molding step, the preform bottom portion and the lower end portion of the preform body portion of the preform, which correspond to the mirror-finished surface of the injection core mold, form a bottom portion of the hollow molded body and a curved rising portion of the hollow molded body continuous with the bottom portion toward a body portion of the hollow molded body.

7. The method for producing a hollow molded body of claim 5, wherein the roughened surface is a finished surface obtained by roughening the outer surface of the injection core mold so as to form longitudinal fine grooves along the outer surface in a height direction of the injection core mold.

* * * * *